United States Patent [19]

Morrow et al.

[11] Patent Number: 4,739,041

[45] Date of Patent: Apr. 19, 1988

[54] ALKYLATED OXIDIZED LIGNINS AS SURFACTANTS

[75] Inventors: Lawrence R. Morrow, Richmond; Michael G. DaGue, Houston; Lawrence E. Whittington, Katy, all of Tex.

[73] Assignee: Texaco Inc., White Plains, N.Y.

[21] Appl. No.: 947,226

[22] Filed: Dec. 29, 1986

[51] Int. Cl.$^4$ .............................................. C08H 5/02
[52] U.S. Cl. ................................... 530/504; 530/500; 166/275
[58] Field of Search ................................ 530/500, 504

[56] References Cited

U.S. PATENT DOCUMENTS

| | | | |
|---|---|---|---|
| 2,379,889 | 7/1945 | Dorland et al. | 530/504 X |
| 3,405,061 | 10/1968 | Keirstead et al. | 530/500 X |
| 3,763,139 | 10/1973 | Falkehag | 530/500 X |
| 3,865,803 | 2/1975 | Falkehag | 530/504 X |
| 3,910,873 | 10/1975 | Lin | 530/500 |
| 4,007,004 | 2/1977 | Bailey et al. | 530/504 X |
| 4,184,845 | 1/1980 | Lin | 530/504 X |

*Primary Examiner*—Earl Nielsen
*Attorney, Agent, or Firm*—Jack H. Park; Kenneth R. Priem; Harold J. Delhommer

[57] ABSTRACT

The invention is a method of producing surfactants from lignin which comprises subjecting lignin to two reactions, alkylation with an alkyl chain having about 3 to about 24 carbon atoms at phenolic sites, and oxidation sufficient to break the lignin into smaller polymeric and monomeric units. The invention also includes using these lignin surfactants in surfactant floods for enhanced oil recovery.

9 Claims, No Drawings

ALKYLATED OXIDIZED LIGNINS AS SURFACTANTS

BACKGROUND OF THE INVENTION

This invention relates to a method of producing surfactants from lignin. More particularly, the invention discloses a process of alkylating and oxidizing lignin to form a group of compounds having surfactant properties. These compounds may be used in surfactant flooding to recover hydrocarbons from underground formations. Alkyloxybenzoic acids which may be found in the lignin reaction products of this invention may also be used in surfactant flooding.

Surface active compounds or surfactants have become extremely important chemicals in our society. Numberless types of surfactants are used for a myriad of applications. To work effectively, most surfactants require water soluble and oil soluble characteristics. It is these mixed characteristics which enable surfactants to lower the surface tension between two disparate liquids.

One problem with many surfactants is their high cost of manufacture. Surfactants which are relatively cheap have an inherent advantage in the market place.

A minor use of surfactants has been in surfactant flooding systems for enhanced oil recovery. But because of the relatively high cost of surfactants, surfactant flooding systems for oil recovery have generally not been economical.

Surfactant flooding to recover oil has been actively investigated due to the relatively poor ability of water floods to displace remaining oil from a reservoir's pore structure. Because of the structure of the reservoir and surface tensions involved, the flood water may form channels or fingers, bypassing the oil in the formation. Investigations of ways to increase oil recovery by improving the displacement ability of water floods have produced useful surfactants which reduce the interfacial tension between oil and water in the reservoir. With lower interfacial tensions, oil that is trapped in the pore structure can be dispersed into the water as smaller and more easily deformable droplets. Many types of surfactants have been investigated and the choice of which surfactant to employ in a water flood operation is dependent upon reservoir characteristics as well as the cost and availability of the surfactants.

Lignin is a waste by-product that the pulping industry produces in prodigious amounts. As a result, a large research effort has been undertaken over the last 40 years in attempts to find uses for the large volume of lignin by-product.

Lignin is comprised of polymeric chains having molecular weights over 10,000 with multiple different units. One substantial monomeric unit contained in the lignin polymeric chains is propane phenol.

Numerous oxidation methods of lignin have been tried. The oxidation of lignin by potassium permanganate and sodium periodate is disclosed in Griggs, B. F., "Modification of Kraft Lignins by Sulfomethylation and Oxidative Sulfonation: Structure and Mechanisms", Ph.D. Dissertation, North Carolina State University (1985). The Griggs Dissertation isolated eight specific benzoic acid structures having single or double aromatic rings as oxidation products of lignin. Other potential oxidizing agents have been used to oxidize side chains on benzene. Potassium permanganate is disclosed in Whitmore, F. C. and Woodward, G. E., *Organic Synthesis*, Coll., Vol. 1, p. 159 (1944). Chromic acid in aqueous solution is disclosed in Pacaud, R. A. and Allen, C. F. H., *Organic Synthesis*, Coll., Vol. 2, p. 336 (1943). Chromic acid in acetic acid as an oxidizing agent of side chains has been disclosed in Rieveschl, G., Jr., and Ray, F. E., *Organic Synthesis*, Coll., Vol. 3, p. 420 (1955). Aqueous sodium dichromate is another potential oxidizer of lignin side chains at elevated temperatures. See, Friedman, L. *J. Organic Chemistry*, Vol. 43, p. 80 (1963). Nitric acid has also been employed to oxidize lignins as disclosed in Popa, V. I., *Cellulose Chem. Technology*, Vol. 19, p. 657–661 (1985).

Mild oxidizing agents of lignin such as copper(II) oxide or sulfate, cobalt(II) oxide or sulfate and nitrobenzene are disclosed in Sarkanen, K. V. and Ludwig, C. H., "Oxidation", Chapter 11 of *Lignins-Occurrence, Formation, Structure, and Reactions*, John Wiley & Sons, Inc. (1971); and Leopold, B., "Aromatic Keto- and Hydroxy-Polyethers as Lignin Models", *Acta Chemica Scandinavica*, Vol. 4, p. 1523–37 (1950).

Several literature references have discussed a procedure for identifying various structures within lignin polymers. This identification method involves methylating lignin at phenolic groups followed by oxidation with potassium permanganate or potassium permanganate followed by hydrogen peroxide. Please see, Freudenberg, K. and Chen, C. L., *Chem. Ber.*, Vol. 93, p. 2533 (1963); Freudenberg, K., Chen, C. L. and Cardinale, G., *Chem. Ber.*, Vol. 95(11), p. 2814 (1962); and Griggs, B. F., Ph.D. Dissertation previously cited.

Procedures on how to make alkyl ethers from lignins may be found in Brauns, F. E., Lewis, H. F. and Brookbank, E. B., "Lignin Ethers and Esters", *Industrial and Engineering Chemistry*, Vol. 37(1) (1945); and Jones, G. M. and Brauns, F. E., "Ethers of Certain Lignin Derivatives", *J. Paper Trade*, Vol. 119(11), p. 108 (1944).

The patent literature discloses multiple uses for various oxybenzoic acid compounds. These uses include adhesives, thermoplastic elastomers, structural molding foam, heat sensitive recording paper, photosensitive uses, a bleach composition, antiseptic, flame retardant compounds, and liquid crystal uses. Aldrich Laboratories and Frinton Laboratories, Inc. both sell substantially pure alkyloxybenzoic acids having various alkyl chains lengths. However, none of the disclosed uses of oxybenzoic acids relate to enhanced oil recovery.

Several publications have disclosed the use of alkylcarboxylate surfactants and alkylbenzoic acid surfactants in enhanced oil recovery. But these disclosures do not mention alkyloxybenzoic compounds. Disclosures and literature on carboxylates include U.S. Pat. Nos. 4,556,495; 4,561,501; as well as Shaw, J. E., "Enhanced Recovery Using Carboxylate Surfactant Systems", *J. of American Oil Chemists Society*, Vol. 61(8), p. 1389 (August 1984); and Shaw, J. E., "Carboxylate Surfactant Systems Exhibiting Phase Behavior Suitable For Enhanced Oil Recovery", *J. of American Oil Chemists Society*, Vol. 61(8), p. 1395 (August 1984).

SUMMARY OF THE INVENTION

The invention is a method of producing surfactants from lignin which comprises subjecting lignin to two reactions, alkylation and oxidation. In a first reaction, the lignin is either oxidized sufficiently to break the lignin into smaller polymeric and monomeric units or alkylated with an alkyl chain having about 3 to about 24 carbon atoms at phenolic oxygen sites to form O-alkylated lignin.

The reaction that was not performed is then carried out on the product of the first reaction. Consequently, if the first reaction on the lignin was an alkylation reaction, then the second reaction is an oxidation reaction. If the lignin was first subject to oxidation, then the second reaction is an alkylation reaction. Chemical analysis indicates that the groups of compounds having surfactant properties formed from the first oxidized, then alkylated lignins are similar to those products formed from the first alkylated, then oxidized lignins.

The invention also includes using these lignin surfactants in surfactant floods for enhanced oil recovery. One group of compounds that may be found among others in the lignin surfactant product, alkyloxybenzoic acids, may also be employed in surfactant floods.

DETAILED DESCRIPTION

Both lignin and lignosulfonate may be used in the instant process to prepare the surfactants. The process differences involve no more than possible modifications of process conditions. Lignosulfonate will, however, result in a lower yield of lignin surfactant since commercial lignosulfonates are only about 50% lignin compared to about 60% to 95% purity for commercial lignin. Furthermore, the oxidation reaction desulfonates lignosulfonate and the sulfonate group is 25% of the weight of lignosulfonate. Regardless of the starting material, the oxidation and alkylation of lignin as disclosed herein degrades and changes the lignin polymer structure to simpler monomeric and polymeric alkyloxybenzoic acid units, and in the case of lignosulfonate, severs the sulfonate radical.

Because lignin is a high volume waste by-product of the pulping industry, it is a very cheap starting material. The use of these surfactants derived from lignin may reduce surfactant costs for enhanced oil recovery floods by as much as 40% to 60%.

The alkylation and subsequent oxidation of commercially available lignin forms a group of low molecular weight compounds having surfactant properties. Most of these compounds have a cyclic ring structure to which an alkoxy chain and a carboxylic acid group are attached. Some of the compounds may have multiple rings or other substituents. However, the groups of products which result from the alkylation and subsequent oxidation of lignin according to this process are highly efficient surfactants. The use of the term "lignin surfactant" herein refers to surfactants derived from lignin according to the invention process.

A similar group of compounds having the same surfactant properties is also produced when the lignin is first oxidized and subsequently alkylated, provided that the initial oxidation is not so severe as to substantially attack the aromatic ring structures. Since similar compounds are produced, this Description makes no attempt to identify which reaction is performed first by the nomenclature "alkylated, oxidized lignin" or "oxidized, alkylated lignin". If the order of reaction is significant in a particular setting, the Description will state which reaction was performed first.

Alkylation as the initial reaction provides some protection for the phenolic oxygen sites and the aromatic ring structure from a strong oxidation reaction. Thus, when oxidation is performed before the alkylation reaction, mild oxidizing agents are preferred in order to produce higher yields of surfactant products. For this reason, alkylation as the initial reaction is preferred.

The basic monomeric unit of lignin is propane phenol. The compound structures illustrated below indicate the basic structural changes undergone by lignin that is first alkylated and then oxidized according to the present invention to produce small alkylated polymeric units of lignin, and in some cases, alkyloxybenzoic acids. Oxidation with nitric acid may not yield any alkyloxybenzoic acid in the lignin surfactant product mix. Some oxidations with potassium permanganate have produced a product which is about 15% alkyloxybenzoic acid.

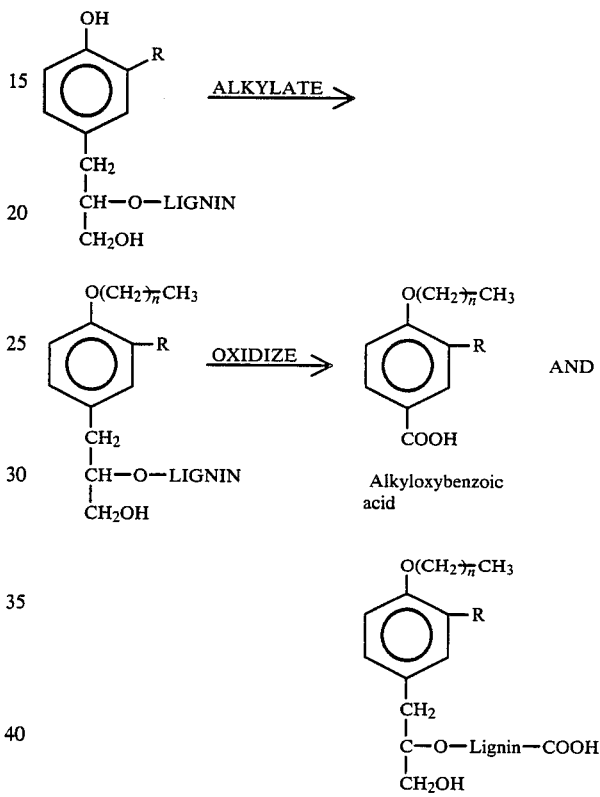

where R = H or OCH₃.

where R=H or OCH₃.

The alkylation of lignin is performed at phenolic oxygen sites with an alkyl chain having about 3 to about 24 carbon atoms. Several methods can be employed to alkylate the phenolic oxygen sites. One method that has proven effective is the use of lead acetate (Pb(C$_2$H$_3$O$_2$)$_2$·3H$_2$O). The lead acetate is dissolved in water and then added to a lignin solution. A lignin-lead complex forms as a precipitate which can be reacted at elevated temperature in organic solvent with an alkyl halide to alkylate the lignin at phenolic sites. Although this lead acetate method is effective in alkylating lignin, it has the drawback of producing lead iodide as a by-product, which must be disposed of or regenerated.

A second, and more preferred alkylation method is to react an alkyl halide with the lignin or oxidized lignin at an elevated temperature in the presence of an alcohol. An alkyl halide and lignin refluxing in a solvent of isopropanol and water for several hours is a more effective way of alkylating lignin than the lead acetate process. Of course, other alkylation methods may be found to be effective in alkylating lignin according to the proposed process.

The different alkylation reactions do not break down or degrade the lignin polymer. It is possible that the alkylation reaction heat may reduce the lignin molecular weight, but not to a substantial degree. The alkylation reaction changes the lignin from a water soluble compound to a water insoluble compound. Oxidation will then change the lignin back to a water soluble compound unless the alkyl chain is exceptionally long or the lignin has more than one aromatic ring.

Analytical tests of alkylated lignins indicate the alkylation occurs at phenolic oxygen sites. Because of the type of reaction performed on the lignin, alkylation will not take place on the ring structure. This has been confirmed by Carbon-13 NMR as well as weak acid titration data which indicates that phenolic levels are substantially reduced from the phenolic levels of the starting lignin material.

The oxidizing agent and oxidation conditions must be strong enough to break the lignin into smaller polymeric and monomeric units and degrade most alkyl chains attached to the aromatic rings to carboxylic acid groups. But oxidation will not significantly affect alkoxy chains at the phenolic sites.

If the lignin has already been alkylated at the phenolic sites, then strong oxidizing agents and conditions are preferred as long as the oxidation reaction is not strong enough to attack the aromatic rings. Stronger oxidation reactions will increase the desired product yield. When the lignin is oxidized prior to alkylation, weaker oxidation agents and conditions must be employed so as to protect the phenolic sites for later alkylation. Otherwise, the percentage yield of lignin surfactant that has been first oxidized and then alkylated will be low.

Not all oxidation agents are suitable for the oxidation step of lignin or alkylated lignin. Undesirable side reactions such as ring condensation, which would produce relatively high molecular material, must be avoided. The invention process requires an oxidizing agent which breaks the carbon chains between the rings, degrading the large lignin polymer into monomeric and smaller polymeric units, leaving an aldehyde, ketone or carboxylate group bonded to the aromatic nucleus.

The stronger oxidation agents for the invention process are potassium permanganate, nitric acid, and a mixture of sodium periodate and potassium permanganate. Relatively weaker oxidation agents which are suitable for oxidation of the lignin prior to alkylation include copper(II) oxide, copper(II) sulfate, cobalt(II) oxide, cobalt(II) sulfate and nitrobenzene. Other oxidation agents which can be employed in the invention include chromium trioxide and catalytic oxidation with oxygen and metal catalysts, chromic acid in aqueous solution or acetic acid, or aqueous sodium dichromate at elevated temperatures.

After a first alkylation reaction, preferred oxidizers are potassium permanganate, nitric acid and a combination of sodium periodate and potassium permanganate. Potassium permanganate as an oxidizing agent has a disadvantage of forming a $MnO_2$ by-product which is not very useful. The sodium periodate and potassium permanganate mixture forms less by-product than the potassium permanganate alone.

If nitric acid is used to oxidize the lignin, there is no significant by-product from the reaction. Unused nitric acid can always be reused. Oxidation with nitric acid will also deposit nitro ($NO_2$) groups on the aromatic rings, increasing the percentage yield. Interfacial tension values of alkylated lignins that have been oxidized with nitric acid are quite low.

The use of chromium trioxide will leave some by-products. Oxygen catalyzed with some metal compounds such as $PtO_2$, Al, and Pt-C has the advantage of no significant by-products. It should also be possible for certain enzymes to oxidize lignin to lower molecular weight materials followed by an alkylation reaction. Specific enzymes have been found in white rot fungus and horseradish which depolymerize lignin. See Kirk, T. K. and Ming, Tien, Science, Vol. 221, p. 661 (1983) and Klibanov, A. M., Chemtech, Vol. 16, p. 354 (1986).

The better products seem to be those oxidized, alkylated lignins made under the more severe oxidizing conditions. However care must be taken with strong oxidizing agents if the lignin has not been first alkylated to protect the phenolic site of interest.

When lignin is subject to oxidation or alkylation alone, the lignin products do not have good surfactant behavior. Indulin C, a trademarked pine kraft lignin sold by Westvaco Corp. was oxidized during several runs. These oxidized only lignins did not show good surface activity at salinities ranging from 2% to 5% by weight of sodium chloride.

The alkylation of kraft lignin was also found to be insufficient by itself. Indulin C was alkylated with a $C_6$ alkyl chain. The resulting product was insoluble in 0.1 M sodium hydroxide solution.

The lignin derivative surfactants may also be sulfonated to increase their water solubility. It is believed that sulfonate groups on the oxidized, alkylated lignins decreases surfactant loss to an underground formation since sulfonated compounds generally suffer less absorption on rock and clays than do the same compounds not sulfonated. Although there are several methods to sulfonate compounds, the preferred method of sulfonation is with sulfuric acid with or without oleum ($SO_3$). The extra sulfonate groups may already be in the sulfuric acid or the sulfonate gas may be bubbled through the sulfuric acid which also contains the compound to be sulfonated.

When alkyloxybenzoic acid compounds were sulfonated with sulfuric acid and oleum, the sulfonated product yield was not very high. The sulfonation process frequently dealkylated the alkyloxybenzoic acid compounds giving a low yield of alkyloxybenzoic sulfonate. It is believed that dealkylation is a lesser problem with oxidized, alkylated lignins.

SURFACTANT FLOODING SYSTEMS

The invention also includes the injection of a surfactant flooding system into a reservoir to recover underground hydrocarbons, where the surfactant flooding system contains lignin surfactants produced by the above described process or where the surfactant system contains an alkyloxybenzoic acid having about 3 to about 24 carbon atoms in the alkyl chain. Depending upon the surfactant formulation, some of these surfactants may be employed as sole surfactants, cosurfactants, or solubilizers in a surfactant flooding system. They may also be used to substitute for a certain percentage of an existing surfactant in a surfactant flooding system to lower the overall cost of the surfactants employed in the flooding system. Many of the lignin surfactants produced according to the above described process as well as the alkyloxybenzoic acid surfactants provide extremely low interfacial tensions between oil and water, and also form stable surfactant systems with many of the commercially available enhanced oil recovery surfactants now on the market.

It is well known that conventional surfactant flooding mixtures are usually composed of one or more petroleum, petrochemical or synthetic sulfonates, a solubilizer or cosurfactant, brine and, optionally, a quantity of hydrocarbon. These components are normally combined to make a surfactant system.

The surfactant system is conventionally injected into a reservoir to form a front followed by the injection of additional brine or water which may contain a mobility control agent. The surfactant system is usually injected as a slug having about 10% to 20% of the pore volume of the reservoir with a total surfactant and solubilizer concentration of about 0.1% to about 10% by weight. A typical surfactant system may be:

1. one or more petroleum sulfonates such as (a) a water soluble sulfonate having a relatively low equivalent weight, and (b) an oil soluble sulfonate having a relatively high equivalent weight, or (c) any other commercially available petroleum sulfonates;

2. a solubilizer or cosurfactant;
3. brine; and
4. optionally, a light hydrocarbon.

As mentioned before, surfactant flooding systems can be formulated under some conditions without a solubilizer and with only a sole surfactant. Petrochemical and synthetic sulfonates may be substituted for petroleum sulfonates. The surfactant slug may also contain or be preceded by a sacrificial agent.

The present invention resides in the use of about 0.1% to about 10% concentration by weight of lignin surfactants in any surfactant flooding system to recover underground hydrocarbons, wherein the lignin surfactants are prepared according to the described process. The instant invention also includes the use of alkyloxybenzoic acid surfactants in any surfactant flooding system for hydrocarbon recovery. Additional surfactants other than the lignin surfactants or alkyloxybenzoic acid surfactants may be included in the surfactant flooding systems.

Surfactant systems are generally pushed through the formation towards a production well by the subsequent injection of a drive fluid. The drive fluid is usually water, gas, or water viscosified by a polymer. Hydrocarbons and other fluids are then recovered at one or more production wells.

Since alkyloxybenzoic acid is a compound expected to be found in some alkylated, oxidized lignin according to the invention process, it was expected that alkyloxybenzoic acid would serve as an excellent compound to model the behavior of the lignin derivatives. Unfortunately, this was not the case. Significant differences were discovered in water and oil solubility and interfacial tensions between alkylated oxidized lignin and alkyloxybenzoic acid. But like the lignin derivatives of the invention process, alkyloxybenzoic acid having about 3 to about 24 carbon atoms in the alkyl chain is an excellent surfactant for single surfactant and multiple surfactant flooding systems.

Several alkyloxybenzoic acids were studied containing anywhere from 6 carbon atoms to 16 carbon atoms. In general, these compounds showed very good interfacial tensions and recovery efficiencies for core floods. Blends of a hexyloxybenzoic acid and an oil soluble surfactant gave a recovery efficiency of over 70% of remaining tertiary oil in one core flood.

Water and oil solubilities are different for the alkyloxybenzoic acids than for the alkylated, oxidized lignin surfactants. Alkyloxybenzoic acids or their salts containing more than 6 carbon atoms in the alkyl chain are not appreciably soluble in water. A 6 carbon side chain was the longest alkyl chain which allowed good water solubility for the salts of alkyloxybenzoic acids. Alkyloxybenzoic acid salts have greater water solubility than their respective alkyloxybenzoic acids. Thus, it is preferred to use the salts in water soluble systems.

On the other hand, the alkylated, oxidized lignin surfactants were completely or substantially soluble in water up to about 16 carbon atoms in the alkyl chain. With 18 or more carbon atoms in the alkyl chain, the lignin surfactants were only slightly water soluble. The sulfonated alkyloxybenzoic acids had much better water solubility, remaining water soluble even for alkyl side chains as long as 16 carbon atoms. Consequently, it is believed that the alkyloxybenzoic acids with a chain length from about 8 to 16 do not have water solubility sufficient to be used as single surfactants for chemical flooding at room temperature, but may be used in multiple surfactant systems.

The water solubilities and neutralization properties of alkyloxybenzoic acids are markedly and unexpectedly different from those of alkyl and alkylbenzoic acids which have been used in enhanced oil recovery. For example, oleic acid ($C_8H_{17}CH=CH(CH_2)_7COOH$) can be readily dissolved at room temperature with sodium hydroxide to give a clear 3 wt. % solution of the carboxylate salt. Oleic acid has a 17 carbon chain attached to the COOH radical.

For alkyloxybenzoic acid salts, the chain must be shortened to about 6 carbons to achieve appreciable water solubility. Alkyl $C_{12}$ or longer alkyloxybenzoic acids do not dissolve in base to readily yield the salt as oleic acid does. Salts of these longer chain alkyloxybenzoic acids form only under severe conditions, such as reaction with sodium metal or an ethoxide. The resulting salts are insoluble in water or toluene.

The following examples will further illustrate the present invention which discloses a method for producing surfactants from lignin by alkylation and oxidation of lignin and employing such lignin surfactants as well as alkyloxybenzoic acids in surfactant flooding systems. These examples are given by way of illustration and not as limitations on the scope of the invention. Thus, it should be understood that reaction steps and amounts may be varied with a process still remaining within the scope of the invention.

EXAMPLE 1

50 grams of Indulin C was dissolved into 450 ml of deionized water and warmed to 50° C. in a water bath. 25 grams of lead acetate ($Pb(C_2H_3O_2)_2 \cdot 3H_2O$) was dissolved into 150 ml of distilled water and then poured slowly into the lignin solution. A precipitate formed which was filtered, washed with deionized water, and dried. The yield was 50 grams of Indulin C lignin-lead complex.

35 grams of the Indulin C-lead complex was mixed with 19 grams of iodododecane and 100 cc of dioxane. The mixture was heated in a Parr reactor at 170° C. for three hours. The mixture was then poured onto a bed of Celite to remove the powdery lead iodide. Celite is a trademarked silica sold by Johns Manville. The Celite was washed a few times with dioxane and the combined dioxane solutions were reduced in volume. Hexane was added which precipitated 23.5 grams of solid alkylated ($C_{10}$) lignin.

EXAMPLE 2

1 gram of an alkylated ($C_6$) Indulin C was added to 30 ml of 1 N sodium hydroxide solution, which was heated to dissolve the solid. The solution was then cooled to room temperature. A mixture of 2.29 grams sodium periodate and 1.2 grams potassium permanganate was added to 75 ml of deionized water and stirred until dissolved. The 30 ml solution of alkylated Indulin C was added by drops to the oxidation agent solution.

The solution was stirred for 1 hour and centrifuged; The filtrate was added to a separatory funnel, acidified, and extracted with ether-tetrahydrofuran. The tetrahydrofuran was rotary evaporated to dryness. The solid was then washed to dryness, yielding 0.2 grams of oxidized, alkylated ($C_6$) lignin.

EXAMPLE 3

1 gram of an alkylated ($C_{12}$)Indulin C lignin was added slowly to 15 ml of concentrated nitric acid and stirred at room temperature for 30 minutes. During this time, the solid changed color from brown to orange-red. The flask was then placed in a water bath set at 80° C. for 10 minutes. The mixture was poured onto ice, filtered, and the solid washed with the deionized water. The yield was 0.7 grams of oxidized, alkylated ($C_{12}$) lignin.

EXAMPLE 4

The comparative immunity of phenolic site alkyl chains to oxidation was tested. Hexadecyloxybenzoic acid was placed in a 1 N sodium hydroxide solution and boiled for 1 hour with potassium permanganate. Any oxidation reaction between the potassium permanganate and the hexydecyloxybenzoic acid would have changed the color of the potassium permanganate from its normal vivid purple to the brown color of manganese oxide ($MnO_2$) precipitate.

No color change or precipitate was observed. All of the starting material was recovered. This indicates that the oxidation step does not affect a long alkyl chain bonded to the aromatic ring by an ether linkage. An alkyl chain bonded directly to the ring would have been oxidized to benzoic acid under these conditions producing a brown precipitate of manganese oxide.

PROCEDURE FOR MEASURING INTERFACIAL TENSION

Interfacial tension (IFT) values were measured with a spinning-drop tensiometer. The IFT of crude oil against field brine is normally measured in units of tens of dynes/cm. Mixtures or compounds added to brine which reduce the interfacial tension to hundreds of mdynes/cm are interfacially active and may be excellent surfactants for enhanced oil recovery.

To measure IFT values, the products were prepared as 2% by weight solutions in sodium chloride brine, which were made alkaline by sodium hydroxide addition. The IFT values were determined after one hour of spinning against a mid-Continent crude oil having a viscosity of about 12 centipoise.

EXAMPLES 5-29

The interfacial tension values for a number of oxidized, alkylated lignins are reported as Examples 5-29 in Table 1. All of these lignin surfactants were first alkylated and then oxidized according to the procedures set forth in Examples 1-3. Final IFT values were measured after 1 hour. All alkyl groups used for the alkylation reactions were linear. Examples grouped by spacing in Table 1 were performed with the same oxidized, alkylated lignin product.

The best results were achieved by the oxidized, alkylated lignins of Examples 12-14 and 15-18. These lignin surfactants had the lowest IFT values across a broad range of salinities. The alkylated oxidized lignin of Examples 15-18 showed particular promise at high salinities of 8% and 10% by weight of sodium chloride.

TABLE 1

| | Interfacial Tension Values for 2% Solutions of Alkylated, Oxidized Lignin Surfactants | | | |
|---|---|---|---|---|
| Example | Alkyl Chain | Oxidizer | Wt % NaCl | IFT (mdynes/cm) |
| 5 | C-6 | $HNO_3$ | 12% | 813 |
| 6 | " | " | 12% | 757 |
| 7 | " | " | 8% | 628 |
| 8 | " | " | 4% | 660 |
| 9 | " | " | 4% | 440 |
| 10 | " | $KMnO_4/NaIO_4$ | 2.3% | 846 |
| 11 | " | " | 4% | 850 |
| 12 | " | " | 3% | 159 |
| 13 | " | " | 4% | 223 |
| 14 | " | " | 5% | 265 |
| 15 | C-8 | " | 3% | 406 |
| 16 | " | " | 5% | 273 |
| 17 | " | " | 8% | 186 |
| 18 | " | " | 10% | 195 |
| 19 | C-10 | " | 3% | 867 |
| 20 | " | " | 5% | 343 |
| 21 | " | " | 8% | 450 |
| 22 | " | " | 10% | 473 |
| 23 | " | $HNO_3$ | 8% | 526 |
| 24 | C-12 | " | 8% | 280 |
| 25 | " | " | 8% | 255 |
| 26 | C-16 | " | 4% | 346 |
| 27 | " | " | 6% | 172 |
| 28 | " | " | 8% | 197 |
| 29 | C-18 | " | 6% | 577 |

EXAMPLES 30-32

The potential of the lignin surfactants is easily demonstrated by comparing their interfacial tension values with the IFT values of commercial surfactants that have been employed in surfactant flooding systems to recover hydrocarbons in the field. Examples 30-32 shown in Table 2 below illustrate much higher IFT values in three different brine concentrations for LN-60COS, a sulfated derivative of ethoxylated alcohol having approximately 12 to 14 carbon atoms in the hydrophobe tail and an equivalent weight of about 550 prepared by Texaco Chemical Co. The measured IFT values of LN-60COS are substantially higher than most of the lignin surfactants tested in Table 1.

TABLE 2

| Interfacial Tension Values for LN-60COS | | |
|---|---|---|
| Examples | Wt % NaCl | IFT (mdynes/cm) |
| 30 | 1.5% | 1500 |
| 31 | 3.5% | 980 |
| 32 | 7.5% | 500 |

EXAMPLES 33-42

The lignin surfactants measured in Examples 33-42 were prepared in a different manner than the previous examples. These surfactants were oxidized prior to being alkylated. Examples 33-36 came from one alkylated, oxidized product and Examples 37-42 came from a second lignin surfactant product. The procedure set forth below was followed to prepare both surfactant samples.

Five grams of Indulin C was acidified in a 6 N HCL solution. The precipitate was collected, washed with deionized water and dried, yielding 3.29 grams.

The dried precipitate was added to a 300 ml Parr reactor and followed with 24 grams of sodium hydroxide, 20 grams of copper(II) sulfate, and 150 ml deionized water. The reaction mixture was heated to 190° C. for two hours. The solution was filtered, acidified, and filtered again, before washing the solid with water. Yield was 1.87 grams of solid oxidized lignin.

The 1.87 grams of oxidized lignin was added to a Parr reactor with 100 ml deionized water. The pH was adjusted to 9.7. 2.2 grams of hexyliodide was added along with 50 ml of isopropyl alcohol. The solution was heated to 175° C. for 30 minutes before readjusting the pH to 9.7. The solution was filtered and the filtrate was rotary evaporated to 1.5 grams of solid oxidized alkylated lignin. Interfacial tension values for the two lignin surfactants prepared by this procedure are reported in Table 3.

TABLE 3

Interfacial Tension Values for 2% Solutions of Oxidized, Alkylated Lignins

| Examples | Wt % NaCl | IFT (mdynes/cm) |
| --- | --- | --- |
| 33 | 2 | 840 |
| 34 | 3 | 951 |
| 35 | 4 | 410 |
| 36 | 5 | 420 |
| 37 | 3 | 775 |
| 38 | 4 | 623 |
| 39 | 5 | 419 |
| 40 | 6 | 315 |
| 41 | 8 | 196 |
| 42 | 10 | 160 |

EXAMPLE 43

Alkyloxybenzoic acid is a compound found in some of the lignin surfactant products. In one of the previous examples, an alkylated ($C_6$) Indulin C lignin was oxidized using a mixture of sodium periodate and potassium permanganate. Hexyloxybenzoic acid was observed being formed during the oxidation by high performance liquid chromatography (HPLC) using a gel permeation column (GPC) to separate molecular weights.

EXAMPLES 44-48

Interfacial tension values were measured for 1% solutions of sulfonated hexadecyloxybenzoic acid in different brine salinities against the mid Continent crude oil previously mentioned.

TABLE 4

Interfacial Tension Values for 1% Solutions of Sulfonated Hexadecyloxybenzoic Acid

| Example | Wt % NaCl | IFT (mdynes/cm) |
| --- | --- | --- |
| 44 | 1% | >4000 |
| 45 | 2% | 515 |
| 46 | 3% | 366 |
| 47 | 4% | 315 |
| 48 | Field Brine* | 241 |

*35,000 TDS

Table 4 indicates the potential of using sulfonated alkyloxybenzoic acids as well as sulfonated, oxidized, alkylated lignin for surfactant floods. The interfacial tension values compare favorably with the 250 mdynes/cm IFT value obtained for 2% TRS-40 in the same field brine. TRS-40 is a trademarked water soluble sulfonate surfactant having an equivalent weight of about 350 formerly sold by Witco Chemical Co. for surfactant floods.

The IFT value for the field brine in Example 48 is lower than that for the 3% and 4% NaCl solutions. This could be due to the presence of divalent cations in the field brine or it could be a coincidence that the optimal IFT is about 3.5% NaCl, the approximate salinity of the field brine.

EXAMPLES 49-56

Two different sodium salts of sulfonated dodecyloxybenzoic acids were evaluated for surfactant activity. One sample was used for Examples 49-53 and a second sample was used for Examples 54-56.

TABLE 5

IFT VALUES FOR 1.0 Wt. % Solutions of Sulfonated Dodecycloxybenzoic Acid

| Example | Wt % NaCl | IFT (mdynes/cm) |
| --- | --- | --- |
| 49 | 2% | 372 |
| 50 | 3% | 320 |
| 51 | 4% | 318 |
| 52 | 5% | 306 |
| 53 | Field Brine* | 341 |
| 54 | 3% | 382 |
| 55 | 4% | 336 |
| 56 | Field Brine* | 360 |

*35,000 TDS

All solutions developed a fine white precipitate. The IFT values were found using the supernatants against the mid-Continent oil. The surfactant properties show promise for using such a sulfonated alkyloxybenzoic acid as the water soluble component in surfactant blends.

EXAMPLES 57-59

When nitric acid is used as the oxidation agent for lignin, aromatic ring nitration is possible. Oil soluble products result when alkylated lignin having long alkyl chains such as about 12 to about 16 carbon atoms, is nitrated. To test their potential for enhanced oil recovery, reversed-phase IFT values were obtained for nitrated, alkylated ($C_{16}$) alkyloxybenzoic acid. This compound is not soluble or dispersible in deionized water. By comparison, TRS-18 is partially soluble in deionized water, or at least dispersible. TRS-18 is a trademarked oil soluble surfactant having an equivalent weight of about 510 sold by Witco Chemical Co. for enhanced oil recovery purposes.

TABLE 6

Reversed-Phase IFT for 1.0 Wt % Alkylated ($C_{16}$)
Nitrated Oxybenzoic Acid in mid-Continent Oil
Against Alkaline NaCl Brines

| Example | Wt % NaCl (pH = 10.7) | IFT (mdynes/cm) | Spinning Time (min) |
|---|---|---|---|
| 57 | 1% | 11 | 1 |
| 58 | 2% | 14 | 1 |
|    |    | 90 | 7 |
|    |    | 245 | 17 |
| 59 | 3% | 18 | 1 |
|    |    | 41 | 8 |
|    |    | 1000 | 35 |

In the reversed-phase IFT measurement using the spinning drop tensiometer, an oil drop containing oil soluble surfactant is placed in a tube containing brine. The reversed-phase IFT values against 1%, 2% and 3% brines shown in Table 6 were extremely low at first, and rose over 20 to 30 minutes to medium to high values. By comparison, TRS-18 in toluene gave reversed-phase IFT values of about 800 to 2300 mdynes/cm when run against similar brines. The IFT values may have increased with time during the spinning test due to the migration of the surfactant from the oil drop to the aqueous phase, which has a much larger volume.

EXAMPLES 60-61

Core floods were carried out at 74° F. in epoxy-coated Berea sandstone cores which measured $2''\times 2''\times 12''$. The dry core was saturated with a 4 wt. % NaCl brine prepared in deionized water. After determination of the brine permeability (typically about 550 md), about 2 pore volumes of brine was passed through the core. The core was flooded to an irreducible water saturation with a mid-Continent crude oil having a viscosity of about 12 centipoise. The oil saturation was typically 0.65. The core was then waterflooded with the same brine to irreducible oil saturation of about 0.37 from 0.65.

The surfactant flood began with the injection of a 0.25 pore volume slug of surfactant formulation, followed by brine containing a mobility control agent. The surfactant formulation consisted of 1.2 weight percent alkylated ($C_{12}$), oxidized ($HNO_3$) lignin of Example 3, 1.2% of TRS-40, and 0.6 wt. % GAF Alipal CO-436. GAF Alipal CO-436 is a trademarked ether sulfate surfactant sold by GAF Corp. The formulation was prepared in 4 wt. % NaCl and the pH was adjusted to about 8 and 9 for different runs using 1N NaOH.

The surfactant formulation was followed by 0.15 wt. % Nalflo-550 in a fresh water which contained less than 400 ppm TDS. Nalflo-550 is a trademarked partially hydrolyzed polyacrylamide sold by Nalco Chemical Co.

Oil production occurred between 0.45 and 1.3 produced pore volumes. There was a sustained high oil cut. Recovery efficiency, the fraction of oil recovered based on that left after waterflood, was 70% at a pH of 9 (Example 60) and 69% at a pH of 8 (Example 61).

EXAMPLES 62-66

Three different surfactant blends of hexyloxybenzoic acid and TRS-18 were prepared for coreflood and IFT analysis. Table 7 with Examples 62-66 illustrates recovery efficiency and IFT values for these three surfactant blends. The corefloods were conducted according to the procedure described in Examples 60-66 as modified by the coreflood conditions enumerated below Table 7.

All three examples had very low interfacial tensions at both pH levels measured. Examples 62, 63, and 64 all gave very good recovery efficiencies during the corefloods. However, the surfactant blend of Example 62 must be near phase instability, since TRS-18 in this brine is expected to be phase unstable. During the coreflood of this blend, a high pressure of 104 psi occurred during polymer injection. This is presumably related to the solution instability and macroemulsion formation. During IFT measurement, a macroemulsion formed around the oil drop preventing measurement of a 1 hour IFT.

Examples 63-66 illustrate that the coreflood recoveries at pH 9 equaled or exceeded the recoveries at pH 11.

TABLE 7

Coreflood and IFT Results Using Hexyloxybenzoic Acid and TRS-18

| | Surfactant System (Wt. %) | | $E_R$ (%) | | IFT (mdynes/cm) | |
|---|---|---|---|---|---|---|
| Example | Hexyloxybenzoic Acid | TRS-18 | pH 11 | pH 9 | pH 11 | pH 9 |
| 62 | 0.6 | 2.4 | 70 | — | 166* | — |
| 63-64 | 0.9 | 2.1 | 61 | 61 | 58 | 24 |
| 65-66 | 1.2 | 1.8 | 50 | 55 | 110 | 32 |

*This is initial IFT after three minutes.

| COREFLOOD CONDITIONS FOR TABLE 7 FLOODS | | |
|---|---|---|
| | pH 11 | pH 9 |
| Brine Saturation | 1.5 PV 0.5% $Na_2CO_3$ | 2 PV 0.7% NaCl |
| Saturation Oil | mid-Continent crude | mid-Continent crude |
| Waterflood Brine | 0.5% $Na_2CO_3$ | 0.7% NaCl |
| Surfactant | 0.25 PV in 0.7% NaCl | 0.25 PV, at pH 9 in 0.7% NaCl |
| Polymer | 0.15 wt % Nalflo-550 in fresh water (Brookfield UL viscosity about 144 cP at 3 rpm or 3.7 $s^{-1}$) | |

Other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. A method of producing surfactants from lignin, which comprises:
    subjecting lignin to a reaction selected from the group consisting of alkylation at phenolic oxygen sites with an alkyl chain having about 3 to about 24 carbon atoms and oxidation sufficient to break the lignin into smaller polymeric and monomeric units;
    oxidizing the alkylated lignin sufficiently to break the lignin into smaller polymeric and monomeric compounds having surfactant properties if the first reaction was an alkylation reaction; and
    alkylating the oxidized lignin at phenolic oxygen sites with an alkyl chain having about 3 to about 24 carbon atoms to form compounds having surfactant properties if the first reaction was an oxidation reaction.

2. The method of claim 1, wherein the lignin is alkylated with an alkyl chain having about 3 to about 16 carbon atoms to produce water soluble surfactants.

3. The method of claim 1, wherein the lignin is alkylated with an alkyl chain having about 18 to about 24 carbon atoms to produce oil soluble surfactants.

4. The method of claim 1, wherein the lignin is oxidized by potassium permanganate, nitric acid, sodium periodate-potassium permanganate, copper(II) oxide, copper(II) sulfate, cobalt(II) oxide, cobalt(II) sulfate, chromium oxide, oxygen catalyzed by metal catalysts, chromic acid, aqueous sodium dichromate, or nitrobenzene.

5. The method of claim 4, wherein the lignin is first alkylated and then oxidized by potassium permanganate, nitric acid, or a mixture of sodium periodate and potassium permanganate.

6. The method of claim 4, wherein the lignin is first oxidized with copper(II) sulfate, copper(II) oxide, cobalt(II) sulfate, cobalt(II) oxide, or nitrobenzene and then alkylated.

7. The method of claim 1, wherein the alkylation is performed with lead acetate to form a lignin-lead complex which is reacted with an alkyl halide.

8. The method of claim 1, wherein the alkylation is performed by reacting the lignin at elevated temperature with an alkyl halide at elevated temperature in the presence of alcohol.

9. The method of claim 1, further comprising sulfonating the alkylated, oxidized compounds having surfactant properties.

* * * * *